United States Patent [19]

Snavely

[11] Patent Number: 4,606,105

[45] **Date of Patent: * Aug. 19, 1986**

[54] METHOD OF BANJO CONSTRUCTION

[76] Inventor: Harry C. Snavely, 115 Plymouth Ave., Winston-Salem, N.C. 27104

[ * ] Notice: The portion of the term of this patent subsequent to Nov. 20, 2001 has been disclaimed.

[21] Appl. No.: 671,774

[22] Filed: Nov. 15, 1984

Related U.S. Application Data

[62] Division of Ser. No. 440,306, Nov. 9, 1982, Pat. No. 4,483,234.

[51] Int. Cl.⁴ .............................................. B29D 17/00
[52] U.S. Cl. .................................................. 29/169.5
[58] Field of Search .................. 29/169.5; 84/269-273

[56] References Cited

U.S. PATENT DOCUMENTS

| | | | |
|---|---|---|---|
| 443,159 | 12/1890 | Bradbury | 84/269 |
| 1,739,006 | 12/1929 | Lange | 84/269 |
| 3,871,263 | 3/1975 | Telesco | 84/269 |
| 4,226,159 | 10/1980 | Lowe | 84/269 |
| 4,483,234 | 11/1984 | Snavely | 84/269 |

*Primary Examiner*—Howard N. Goldberg
*Assistant Examiner*—P. W. Echols
*Attorney, Agent, or Firm*—Wigman & Cohen

[57] ABSTRACT

A method of banjo sub-assembly construction is disclosed. The metal tone ring and mating wooden rim are fabricated and assembly with an interference fit so as to provide a tight and permanent interface therebetween and thereby enhance the quality and volume of sound from the banjo instrument. A tone ring expander apparatus is used to expand the tone ring to permit the wooden rim to be easily inserted in the tone ring.

6 Claims, 5 Drawing Figures

METHOD OF BANJO CONSTRUCTION

CROSS-REFERENCE TO RELATED APPLICATION

This application is a division of U.S. patent application Ser. No. 440,306 filed Nov. 9, 1982, now U.S. Pat. No. 4,483,234.

BACKGROUND OF THE INVENTION

The present invention relates to musical instruments and more particularly to a novel method of banjo construction. Specifically, the invention is directed to a method of securing the metal tone ring of a banjo to the wooden rim under a tight, uniform and permanent radial compression.

A search of the prior art failed to uncover any prior art references which disclose the novel aspects of the present invention. Several patents were uncovered which disclose a variety of banjo constructions. The following is a listing of the patents uncovered during the aforesaid search:

U.S. Pat. No. 1,701,420
U.S. Pat. No. 3,240,096
U.S. Pat. No. 3,921,492
U.S. Pat. No. 4,226,159

The pot assembly of a conventional construction comprises a circular non-metallic (usually wooden) rim to which is fitted a metal tone ring and a plastic or animal-skin "head" stretched over the tone ring by an annular hoop tensioned by means of a plurality of hooks mounted to a resonator flange. Heretofore in the art of banjo design and construction there have been numerous types and configurations of tone rings fitted to the wooden rim of the banjo pot assembly, the various tone ring configurations being intended to enhance the sound of the banjo instrument.

In the art of banjo construction, the tone ring and wooden rim are machined to particularly precise diametrical tolerances so as to obtain a substantially zero clearance between the inside diameter of the ring and the outside diameter of the rim. The tone ring and wooden rim are then hand mated by carefully pushing and/or rotating one to the other to obtain as snug a fit as possible.

Quality and volume of the sound of the banjo is directly related to the snugness of the fit among the various components of the banjo pot assembly, and especially to the uniformity and tightness of the fit between the tone ring and the wooden rim. Consequently, there is a limitation on the quality and volume of sound that may be obtained. Furthermore, shrinkage of the wood with time can also cause a significant loss of sound quality and volume, such as, for instance, damping and distortion of vibration, even though at the time of manufacture the banjo sound quality and volume characteristics were entirely acceptable.

One way of overcoming the problem of looseness between the tone ring and wooden rim is a relatively recent innovation known as the Stelling pot to which the above-listed U.S. Pat. No. 3,921,492 is directed. According to the Stelling pot construction, the tone ring is provided with a beveled surface which is wedgingly related to a wooden rim whereby tightening of the head insures a snug and intimate contact between the tone ring and rim. In the Stelling design, however, the structure of the wooden rim has a beveled surface which precludes the use of popular, existing cylindrical-walled structures. Such cylindrical-walled types are known for excellence of sound provided a tight tone ring/rim structure can be achieved and maintained.

SUMMARY AND OBJECTS OF THE INVENTION

In view of the foregoing limitations and shortcomings of the prior art constructions, as well as other disadvantages not specifically mentioned above, it should be apparent that there still exists a need in the art for a method of securing the metal tone ring and wooden rim of a banjo pot assembly together in a radially snug, uniformly fitting relationship. It is, therefore, a primary objective of this invention to fulfill that need by providing a method of obtaining a radial tightness between the tone ring and wooden rim which far exceeds that possible by hand fitting and which is established within the elastic limits of the materials used.

More particularly, it is an object of this invention to provide a method of constructing a banjo pot subassembly which is suitable for use with conventional assembly techniques or may be automated for mass production.

It is another object of this invention to provide a method of banjo construction in which the banjo has improved, substantially non-degradable tonal quality and brilliance of sound by reason of the provision of a substantial interference fit between the inside diameter of the metal tone ring and the outside diameter of the wooden rim.

Yet another object of this invention is to provide a method of radially expanding the annular metal tone ring to permit the insertion of an oversize wooden rim into the tone ring whereby an extremely tight and uniform interference fit between the tone ring and rim can be maintained indefinitely.

Still another object of this invention is to provide an improvement in the economics of high quality banjo manufacture by a construction method which eliminates the need for timeconsuming and expensive handfitting of banjo pot components.

Briefly described, the aforementioned and other objects of the invention are accomplished by providing a suitably dehydrated wooden rim machined to a given outside diameter appropriate for mating with a particular design and size of metal tone ring. The inside diameter of the annular metal tone ring is machined to a diameter smaller than the outside diameter of that portion of the wooden rim which mates with the ring. An interference fit which stresses these two components purposely within their elastic limits is thereby obtained at assembly. An annular step or shoulder is provided on the inside edge of the tone ring flange for engagement by a plurality of radially movable tension hooks so that the tone ring can be radially expanded to accommodate the oversize wooden rim.

The method aspects of the invention are accomplished by providing a tone ring expander apparatus comprising a base plate with a circular array of radially disposed, fluid-actuated piston/cylinder devices. A tone ring is loaded into the expander apparatus, flange upwardly, and urged into a substantially round condition by four clamps each located preferably at 90° intervals about the array.

The piston rod of each piston/cylinder device, which may be pneumatic or hydraulic, is provided with an appropriate tone ring gripper or hook which engages the annular shoulder on the tone ring flange. Appropriate pressurization of the cylinders of the piston/cylinder devices will cause the piston rods to retract into their respective cylinders, thereby expanding the tone ring diameter. The oversize wooden rim is then placed in the ring and urged downwardly into the expanded tone ring and into engagement with a horizontal surface of the tone ring by a vertical force which may be a dead weight. Venting or reduction of pressure in the cylinders releases the expanding force on the tone ring which springs inwardly, tightly and permanently placing the wooden rim under a uniform radial compression.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF A PREFERRED EMBODIMENT

Figure 1:
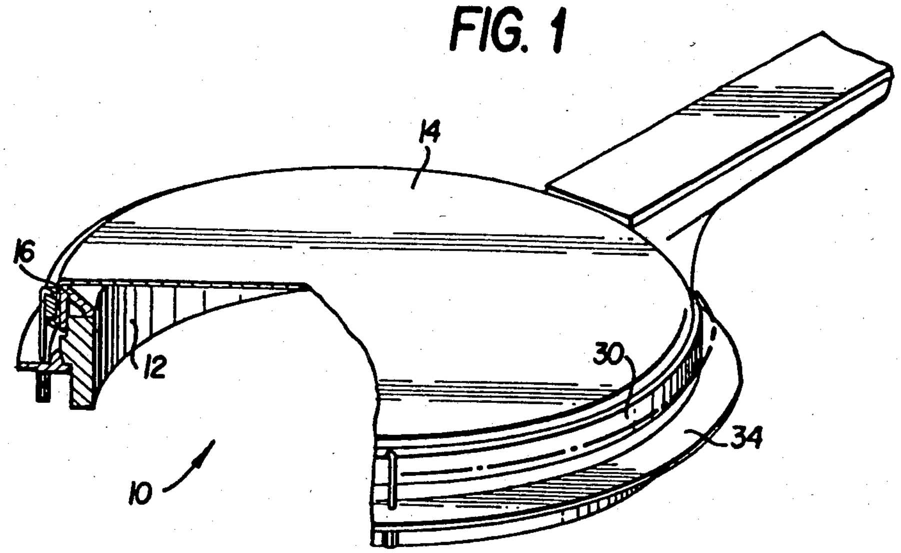
FIG. 1 is a fragmentary perspective view of a banjo construction showing the significant elements of a banjo pot assembly.

Referring now in detail to the drawings, wherein like parts are designated by like reference numerals throughout, there is illustrated in FIG. 1 a banjo pot assembly designated generally by referenced numeral 10. Pot assembly 10 comprises a circular wooden rim 12 over which is tautly stretched a plastic or animal-skin "head" 14.

The wooden rim undergoes a preparatory treatment in an environment of about 30 percent relative humidity at about 73° F. for a time period which varies depending on the initial dryness of the wood for the purpose of dehydrating the wood to a moisture content of about 6 percent by weight.

Figure 2:
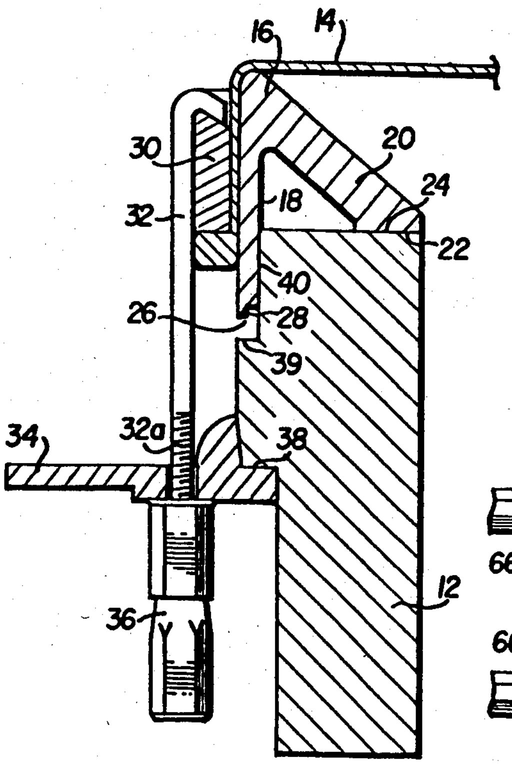
FIG. 2 is a radial cross-sectional view of the banjo pot assembly of FIG. 1.

As best illustrated in FIG. 2, an annular metal tone ring 16 is fitted to the outside cylindrical wall of the wooden rim 12 according to a method and with an apparatus to be described in greater detail hereinafter. Tone ring 16 has an inverted, generally V-shaped cross-section as seen in FIG. 2. Tone ring 16 is formed with a cylindrical flange portion 18 and an inwardly and downwardly inclined leg portion 20, the free end of which is provided with a flat annular surface 22 which snugly abuts a flat annular surface 24 of the wooden rim 12.

Flange portion 18 of the tone ring has an annular shoulder 28 provided in the free end 26 thereof for a hereinafter described purpose. Head 14 is stretched tautly over the rounded vertex of the tone ring by means of a tension hoop 30 and a plurality of bracket hooks 32. The bracket hooks 32 are secured to a resonator flange 34 by means of a threaded connection including a threaded stem **32*a* and bracket nuts 36. Resonator flange 34 bears upwardly against the lower annular shoulder 38 of a raised portion on the periphery of the wooden rim 12. The free end 26 of the tone ring 16 is spaced from the upper shoulder 39 of the raised portion of the wooden rim 12 whereby access to the shoulder 28** is not blocked.

Advantageously, according to the present invention, at the circumferential interface 40 between the wooden rim 12 and the tone ring flange 18, an interference fit is provided to ensure a snugness of fit during the entire life of the banjo instrument regardless of fluctuating environmental conditions, such as temperature and humidity. The magnitude and tolerances of the interference fit will vary depending on a number of factors, among them the modulus of elasticity, elastic limit and thickness of the tone ring and wooden rim material, the heat treatment of the tone ring, the type and moisture content of the wood used for the rim and the like. Determination of an appropriate interference fit for a given tone ring and wooden rim is well within the purview and capabilities of those skilled in the art to which the invention pertains.

Figure 5:
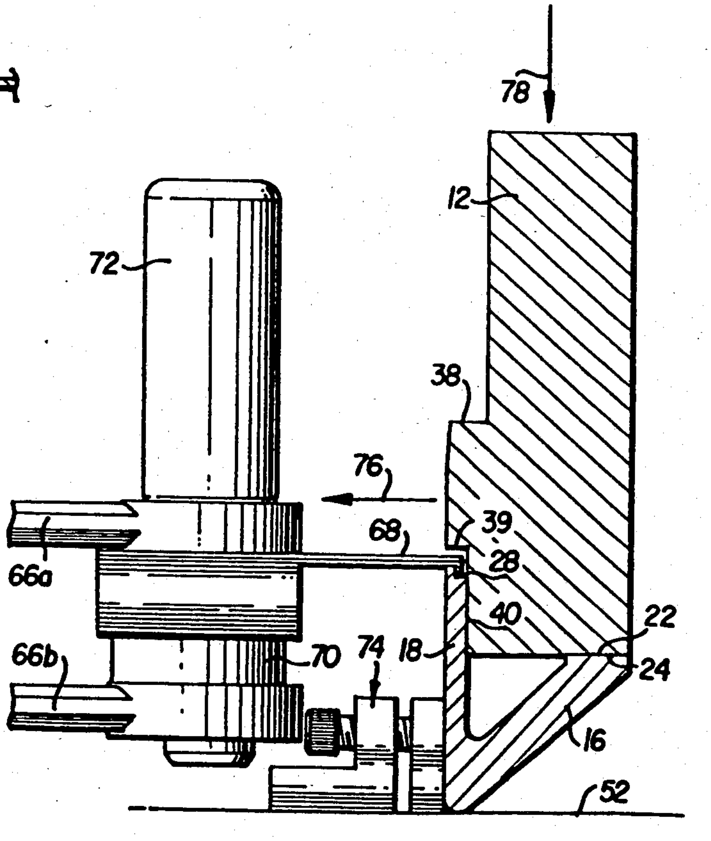
FIG. 5 is a cross-sectional view showing the operation and manner of interconnection of the tone ring gripper with the shoulder of the tone ring flange.
Figure 3:
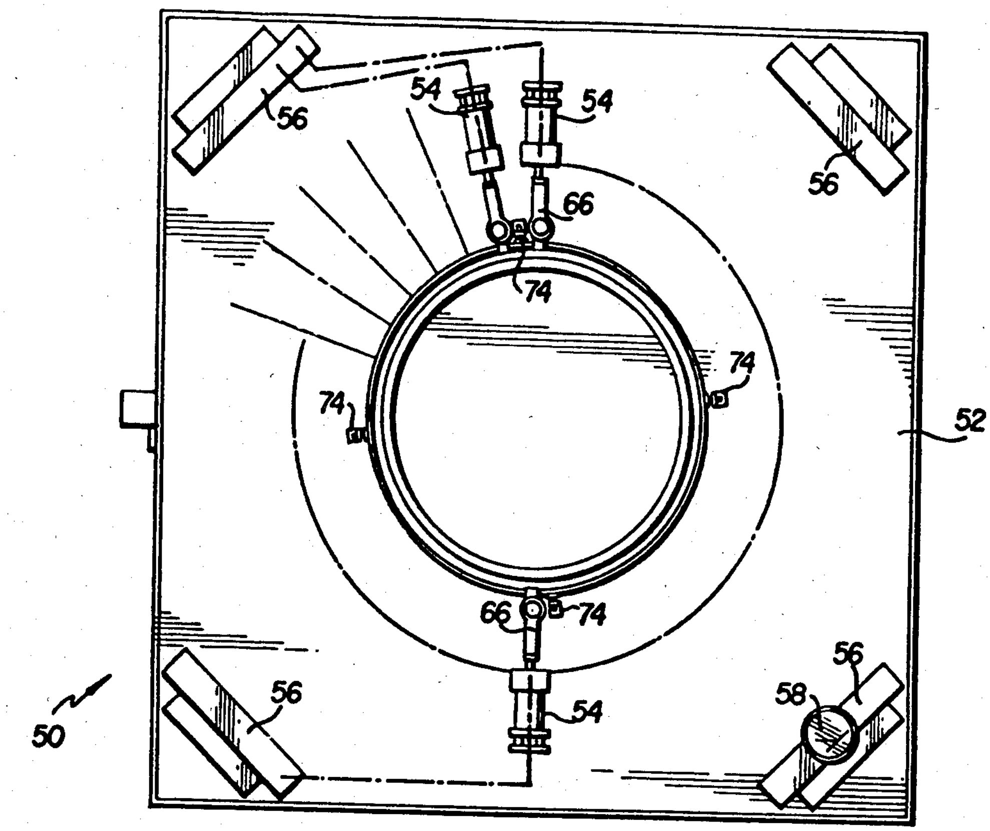
FIG. 3 is a plan view illustrating a tone ring expander apparatus.
Figure 4:
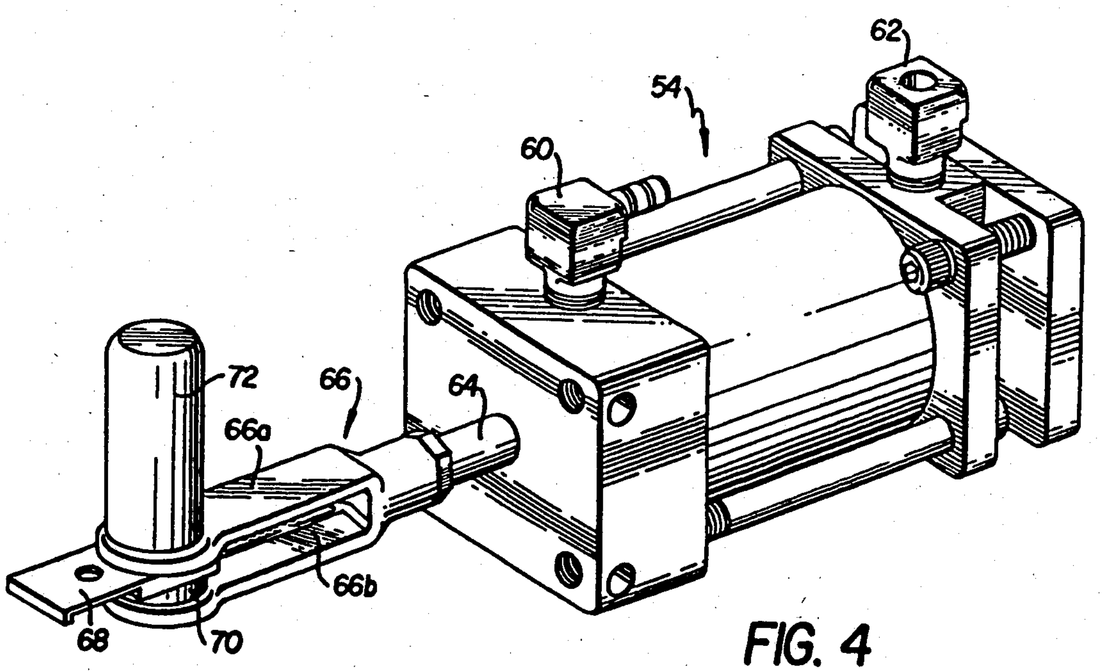
FIG. 4 is a perspective view of a single piston/cylinder device with tone ring gripper comprising a portion of the tone ring expander apparatus of FIG. 3.

Referring now to FIGS. 3–5, a suitable apparatus used to obtain the aforementioned interference fit will be described. In FIG. 3, there is illustrated a tone ring expander apparatus designated generally by reference numeral 50. Apparatus 50 comprises a base plate 52 to which is securely mounted a plurality of fluid-actuated piston/cylinder devices 54 in an equi-angularly spaced, circular array.

A construction which has been found particularly suitable for the purposes of this invention comprises thirty pneumatic cylinders, each with a one-inch bore, one-inch stroke and 5/16 inch diameter piston rod, as manufactured by the Sheffer Corporation, Cincinnati, Ohio. The pneumatic cylinders may be supplied with air from an air tank (not shown) br other suitable air source via four air manifolds 56, each mounted on a respective corner of the base plate 52. An air gauge 58 is connected to one manifold to indicate air pressure to the expander apparatus operator.

As shown in FIG. 4, the air cylinder 54 is provided with an air inlet 60 and vent 62. Piston rod 64 is provided with a bifurcated yoke fitting 66 having a pair of fingers **66*a*, 66*b* between which are mounted a gripper hook 68 and spacer 70. An upstanding handle 72 is mounted on the yoke fitting 66 to facilitate manual engagement and disengagement of the gripper hook 68** with the tone ring.

Now referring to FIGS. 3 and 5, there is shown a tone ring 16 positioned in an inverted orientation on base plate 52 concentrically with the circular array of cylinders 54. To ensure that the tone ring 16 is in a substantially round condition, four adjustable clamps 74 are mounted to the base plate 52 and angularly spaced at approximately 90° intervals on a diameter somewhat greater than the maximum tone ring diameter.

As shown best in FIG. 5, the gripper hooks 68 of the cylinders 54 are engaged with the shoulder 28 of the tone ring flange 18. Introduction of air to the inlets 60 of cylinders 54 will cause retraction of the piston rods 64 and, thereby, movement of the hooks 68 radially outwardly in the direction shown by arrow 76. Such radially outward movement of the gripper hooks 68 will expand the diameter of the tone ring flange 18 to an extent depending on the stiffness of the tone ring and the magnitude of the expanding force provided by the air cylinders 54.

When the tone ring flange has been sufficiently expanded, an oversize wooden rim 12 is inserted into the tone ring until the flat annular surface 24 of the wooden rim abuts the flat annular surface 22 of the tone ring. A vertical force of about 200 lbs. deadweight and represented by arrow 78 is then applied to the upper surface of the wooden rim 12 to hold the rim in position. Air is then vented from the cylinders 54 thereby permitting the tone ring flange 18 to spring inwardly, tightly and permanently placing the rim under a uniform radial compression at the interface 40 between the tone ring and rim. The gripper hooks 68 are then disengaged from the shoulder 28 and the tone ring/wooden rim assembly is removed from the expander apparatus 50.

Although only a preferred embodiment employing air cylinders is illustrated and described herein, it is the intended spirit, scope and teachings within the purview of the appended claims to cover the concept of a permanent interference fit between the wooden rim and metal tone ring of a banjo pot sub-assembly. This interference fit is established within the elastic limits of the materials used for these two components. It will be appreciated that many variations and/or modifications of equipment may be used to accomplish the same end result.

What I claim is:

1. A method of constructing a banjo pot sub-assembly including a tone ring and a cylindrical rim, comprising the steps of:
   - providing a cylindrical rim having an outside diameter;

- providing an annular tone ring having a flange portion with an inside diameter smaller than the outside diameter of the rim;
   - forcibly expanding the tone ring flange portion outwardly to an inside diameter substantially equal to or larger than the outside diameter of the rim;
   - inserting the rim into the expanded flange portion; and
   - permitting inward contraction of the flange portion so that the flange portion tightly and permanently grips the rim with substantially uniform radial compression within the elastic limits of said rim and ring.

2. A method according to claim 1, including the step of machining the inside diameter of the flange portion to an inside diameter smaller than the outside diameter of the rim.

3. A method according to claim 1, wherein said expanding step comprises the steps of gripping a free annular end of the flange portion at a plurality of locations thereabout and urging said flange portion radially outwardly at each of said locations.

4. A method according to claim 3, wherein said inserting step includes the step of applying an axial force to said rim.

5. A method according to claim 1, including the step of forcing said tone ring into a substantially round condition prior to forcibly expanding the tone ring flange portion.

6. A method according to claim 1, including the step of preconditioning said cylindrical rim by dehydration.

* * * * *